Patented Aug. 21, 1934

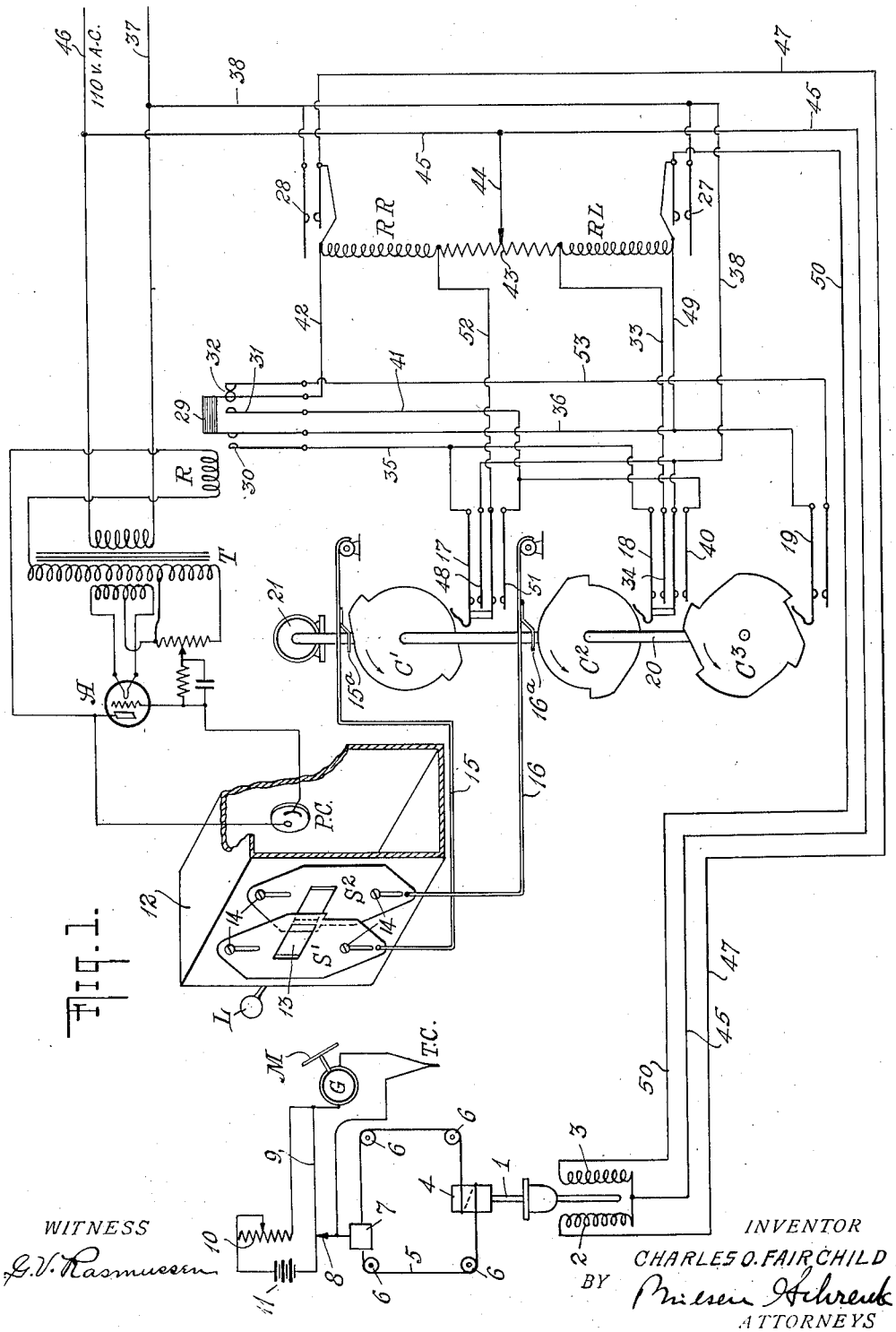

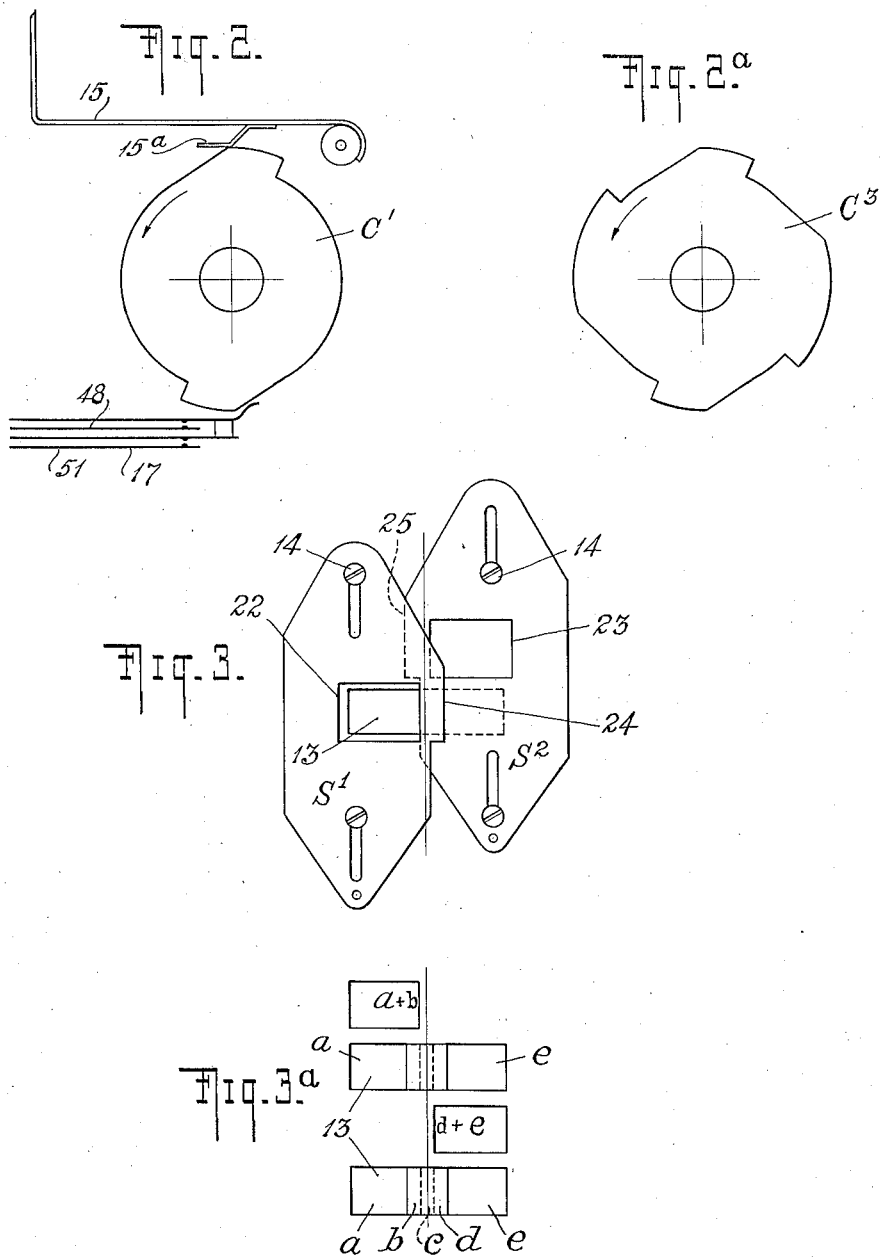

1,970,559

UNITED STATES PATENT OFFICE 1,970,559

CONTROLLING SYSTEM

Charles O. Fairchild, Brooklyn, N. Y., assignor to Charles J. Tagliabue Mfg. Co., Brooklyn, N. Y., a corporation of New York Application February 21, 1931, Serial No. 517,543

44 Claims. (Cl. 172—239)

This invention relates to new and useful improvements in controlling systems, and particularly to controlling circuits comprising a light sensitive element such as a photoelectric cell.

It is an object of the present invention to provide a controlling system which is simple in operation, inexpensive to construct and maintain, and reliable as to results.

In the specific embodiment of the invention in connection with which the invention will be described, but which may be readily adapted for other purposes, these results are accomplished by moving a beam of light in accordance with a condition to be observed or registered with respect to a photo-electric cell, and periodically and intermittently exposing the cell to the action of the beam and, in accordance with the position of the beam causing the rotation of a motor in one direction or the opposite direction or to hold the motor against rotation. The motor in turn controls the position of a recording or registering stylus or of a pointer. In this way accurate observations of a condition to be observed can be made by the application of my controlling system to a recording or registering device and similarly, an accurate control can be made effective upon an operation to be performed or maintained by the photo cell system.

I thus provide a system in which in its preferred embodiment a single light-sensitive element is capable of affecting a plurality of operations, e. g., through the agency of controlling circuits. The complete system may, of course, include more than one photoelectric cell cooperating with each other in any desired manner. Owing to the fact that a single cell may, pursuant to my invention, exercise control over more than one operation or circuit, the system is not dependent on the individual characteristics of cells, and the cost of one or more cells may thus be saved.

In accordance with the particular embodiment of the invention illustrated in the drawings, the control is accomplished by periodically testing the presence or absence of light at a plurality of points by means of a single cell, and variably operating the controlling circuits in accordance with the luminous effects produced during a given interval of time. For instance, where the light traverses an opening through which the cell is exposed at one point, one controlling circuit is closed, and if the light traverses the opening at another point, another controlling circuit will be closed, shutter mechanism being provided alternately and periodically to block and free the various points of the opening.

The invention, of course, may find many applications in various arts and its details may be modified to suit innumerable operating requirements. I do not wish to be limited either to the specific embodiment herein disclosed, or to its specific application.

In the drawings, Fig. 1 is a schematic illustration of an embodiment of the present invention; Figs. 2 and 2ª show detail views of the cams; Fig. 3 illustrates the light control shutters; and Fig. 3ª illustrates graphically the successive operating stages of the shutters.

Referring now to Fig. 1, a device exemplifying the principle and various features of the invention consists of a motor 1, having two windings 2 and 3, adapted to drive it in a clockwise and counter-clockwise direction, respectively. The motor shaft is equipped with a drum 4 on which is wound a cord 5 which, through pulleys 6, moves a carriage 7 from right to left, or from left to right, depending on the direction in which the motor is rotated. The carriage is equipped with a sliding contact 8 which cooperates with the slide wire of a potentiometer. The potentiometer consists of a slide wire 9, a variable rheostat 10, galvanometer G, thermocouple TC, and a battery 11. The galvanometer is of the reflecting type. It is equipped with a mirror M, the turning of which is restricted by means of mechanical stops.

A photoelectric cell PC is mounted within a casing 12 carrying a lamp L, a light from which may be reflected by the mirror M, through a wide slot 13 in the casing to energize the photoelectric cell. The opening and closing of slot 13 are controlled by means of shutters $S^1$, $S^2$, which are slidably mounted on the front of the casing 12 on screws 14. By gravity, the shutters tend to remain in the position shown in Fig. 1 of the drawings, but may be raised to obstruct the opening 13 by means of arms 15 and 16, which are actuated by cams $C^1$ and $C^2$, respectively. Cams $C^1$ and $C^2$ operate contact sets 17 and 18, respectively, and a cam $C^3$ operates contact set 19. All the three cams are concentrically mounted on a shaft 20 constantly driven by a motor 21. The contact sets 17, 18, and 19 control a set of relays which in turn control the driving circuits of motor 1. The relays and the photoelectric cell are interconnected through an amplifier.

The cutting of the cams $C^1$ and $C^2$ is illustrated in Fig. 2, while the cutting of the cam $C^3$ is shown in Fig. 2ª. Cams $C^1$ and $C^2$ are identical, but are angularly displaced with respect to one another on the shaft (see Fig. 1). Each cam $C^1$ and $C^2$ operates its associated shutters and contact set twice during each revolution. Cam $C^3$ operates its contacts four times by means of two short and two long cam faces. The cams $C^1$ and $C^2$ actuate the lifting rods 15 and 16 through shoes 15ª and 16ª, whereby the shutters remain elevated for a longer interval than the closing of the contact set controlled by the cam.

The cams operate in the following order: $C^1$, $C^3$, $C^2$, $C^3$, $C^1$, $C^3$, $C^2$, $C^3$ and, as will be set forth in greater detail, cause the performance of shutter and contact operations in the following sequence starting from the positions shown in Fig. 1: contact 19 closes, $S^1$ closes, 19 opens, contact 17 closes, $S^1$ opens, 17 opens, 19 closes, $S^2$ closes, 19 opens, contact 18 closes, $S^2$ opens, 18 opens.

The manner in which the shutters control the opening 13 is best explained in connection with Figs. 3 and 3ª. During the up-and-down movement of the shutters $S^1$ and $S^2$, the opening 13 through which light may reach the photoelectric cell is divided into sections $a$, $b$, $c$, $d$, and $e$. This is accomplished by the contours and relative motions of shutters $S^1$ and $S^2$. Each shutter has an opening 22, 23, and a projection 24 and 25, respectively. In the open position of $S^1$ and the closed position of $S^2$ only sections $a$ and $b$ of opening 13 are open. When $S^2$ opens (descends), projection 25 will close section $b$. Section $d$ being closed by projection 24, only sections $a$ and $e$ will be open. When $S^1$ closes, it will close section $a$ and open section $d$. Section $e$ remains open through 23 of $S^2$. When $S^1$ opens, it will close section $d$ and open section $a$. Section $c$ of the opening is at all times obstructed by the overlapping portions of shutters $S^1$ and $S^2$.

The device functions in such a manner that when the mirror reflects light towards section $c$ of the opening, the motor 1 and therefore the carriage 7 remain stationary. While light shines through section $a$ the motor 1 is started to move the carriage 7 from left to right, and while light shines through section $e$, the carriage is moved from right to left. While light shines through $b$ or $d$, the carriage is moved to the right or to the left, respectively, but its motion is periodically interrupted. During the passage of light through $a$ and $e$, the motor runs continuously. It will be obvious to those skilled in the art that the rotation of motor 1 or the motion of carriage 7 may be translated into a visible or audible record indicating temperature conditions, or they may be translated into temperature controlling or other operations on results of any kind by the interposition of suitable means. It will be also obvious to those skilled in the art that the control of the bridge or other analogous primary light control may be effected by other means than one responsive to temperature variations. In the following detailed description of the operation I shall describe a device adapted for recording temperature variations on a moving chart. The use of the present invention in a temperature recording system insures high speed and great accuracy, since the inertia of the mechanism may be reduced to a minimum. We may assume that the chart is moved by motor 21 and the recording pen or stylus is carried by 7. Since such devices are well known in the art, these and other details of the recording mechanism are omitted.

Let us assume that the carriage 7 is in its farthest left-hand position and that the galvanometer mirror M reflects light through the left-hand edge of $a$, that the shutters are in the positions shown in Fig. 3, and that the cam $C^3$ has just opened contacts 19. While light shines through $a$, the photoelectric cell PC is energized and causes, through the agency of an amplifier A, the energization of relay R. The amplifier A is supplied with current from the main line through the usual transformer T and operates in the well known manner. When the relay R is energized, it attracts its armature 29, closes contacts 30 and 31, and opens contacts 32. This has no immediate effect on the circuits. Shortly after the cam $C^2$ has pushed the shutter $S^2$ into the closed position, its opposite cam face will close the contacts 18. The relay R being energized, a shunt is closed around the winding of RL through conductor 33, contacts 34, conductor 35, relay contacts 30 and back to the winding of relay RL through conductors 36 and 49. An energizing circuit is closed for relay RR from leg 37 of the main line, conductor 38, cam contacts 40, conductor 41, relay contacts 31, conductor 42, the winding of relay RR, one-half of the resistor 43, conductors 44 and 45, leg 46 of the line. The relay RR becomes energized and locks up through its contacts 28, and bridges across the line conductors 37 and 46, the winding 2 of motor 1. Winding 2 of the motor had already been supplied with current through a circuit from line 37, conductor 38, cam contacts 40, conductor 41, relay contacts 31, conductors 42 and 47, winding 2, conductor 45 and back through leg 46. The winding 2 drives motor 1 to move the carriage from left to right.

When the cam face $C^2$ leaves the shoe 16ª, the shutter $S^2$ drops into its open position and then the opposite cam face permits the opening of contacts 18. The shunt is removed from winding RL, but RR and winding 2 remain energized. Relay R remains energized since light continues to shine through $a$. A short cam face on $C^3$ will now close contacts 19, but contacts 32 of R being open, this is without any effect.

Shortly before $C^3$ permits contacts 19 to open, $C^1$ lifts shutter $S^1$ into its closed position, which obstructs the light projected through $a$, whereupon the activation of photoelectric cell PC ceases and R becomes deenergized. Contact set 17 is then closed but, owing to the deenergized condition of R, without any effect.

After an interval shutter $S^1$ drops into the open position and contacts 17 are opened. If the light is still in $a$, relay R becomes energized. Then $C^3$ again closes contact 19 and the successive operations are repeated in the manner previously described. While light shines through $a$, motor winding 2 is energized and the carriage is moved constantly from left to right.

Similarly, while light shines through $e$, the motor winding 3 is kept energized and the carriage 7 moved from right to left. In this case, the closing of contact set 18 is without effect because the relay R will be deenergized when $S^2$ closes. On the other hand, when cam $C^1$ closes shutter $S^1$, the relay R will be energized by light through $e$, and upon the closing of contacts 17, a circuit is established from leg 37, through conductor 38, cam contacts 48, conductor 35, relay contacts 30, conductors 36 and 49, and then through one path including RL, 43, and 44, and another path including conductor 50 and winding 3 to conductor 45 and leg 46 of the line. Relay RL locks up through its contact 27 and bridges winding 3 across the line. The relay winding RR is shunted through 42, 31, 41, cam contacts 51, and conductor 52, so that this relay cannot accidentally become energized during this phase of the operation.

While the light beam plays through section $b$ of opening 13, the motor 1 is periodically arrested, causing (in the present exemplification of the invention), the marking of a step-by-step record on the chart. This is accomplished under the control of projection 25 on shutter $S^2$.

Let us assume that $S^1$ is open, $S^2$ closed (up), relay R energized by light penetrating through $b$, and RR and 2 are energized. When cam $C^2$ releases shutter S² and opens contacts 18, relay R becomes deenergized because projection 25 obstructs the passage of light through section b. Relay RR remains energized and the motor continues to be driven by winding 2 until cam C³ closes contacts 19. Owing to the deenergized condition of R a path is closed from the lower end of the winding of RL, through conductor 49, cam contacts 19, conductor 53, relay contacts 32, conductor 42, to the winding of RR. The relay RL becomes energized in parallel with RR and energizes in turn winding 3 of the motor by current flowing through its locking contacts. Both motor windings being energized, the motor is stopped.

Relays RL and RR remain locked up until shutter S² again opens. If at this time the light beam is still within the confines of b, the relay R becomes energized and completes in its contacts 30 the shunt for RL which includes contact 34 of cam C². The relay RL and motor winding 3 become deenergized, and the motor starts rotating under the control of its left-hand winding. The starting and stopping of the motor will be repeated under the joint control of S², R, C² and C³ as long as the light is directed towards b.

If the light falls on section d the carriage 7 is moved step-by-step from right to left in a manner which will be clear from the foregoing.

It will be seen, therefore, that as the mirror approaches the predetermined or desired position in which the light is reflected in the direction of c (which in the present case indicates that the IR drop subtended in the slide wire nearly equals the E. M. F. of the T. C.), the rate at which the carriage 7 moves is materially reduced. During this critical period more detailed information is conveyed to the chart.

While the light beams are directed towards section c, no light passes through the opening 13 and relay R remains deenergized in all positions of the shutters. The first time cam C³ closes contacts 19 upon the deenergization of R, both relays RR and RL become energized and cause the energization of both motor windings. Neither relay can be shunted out because while relay R remains deenergized, the closing of cam contacts 17 and 18 is without effect. The carriage 7 remains stationary.

If, during the next cycle of cam operations the light is in b, then cam C² will shunt out RL, and if the light is in d, the cam C¹ will shunt out RR. The carriage 7 will be moved to the right or to the left.

Obviously, the direction in which the carriage moves in response to the closure of certain contacts may be reversed by reversing the connections to the galvanometer or to the motor windings.

The two shutters with their associated mechanisms establish five different time channels or test directions by which a primary cause or motion, i. e., the temperature of the thermo-couple or the rotation of the mirror, may have a variable influence on a secondary motion or effect, i. e., travel of carriage 7 or record on chart. The shutters continuously test the presence or absence of a light beam within one of the five sections of opening 13, and although only one light responsive element (PC) is provided, the presence or absence of light in a section is immediately conveyed to the desired point. A plurality (five in the present example) of test or controlling circuits may be set up by the relays and cams, and all the circuits are periodically and successively controlled by a single cell.

Another aspect of my invention is that a single light responsive element may be used for causing selective operations (e. g., left or right movement or stoppage of carriage 7) in response to varying light impulses or effects, (e. g., light radiated at two or more points.) The photocell acts as though it were constantly moved, and in a definite sequence, in front of the mirror. It will be obvious to one skilled in this art that any suitable light responsive device may be used in lieu of the photocell, and that the shutters may be replaced by other means capable of performing or responding to timed sequences of operations, or for producing the varying light effects.

The utilization of a single photocell for testing light at two or more points is important, not only from the standpoint of economy, but also to insure uniform response to all testing operations. Where a plurality of tests are made through the agency of two or more light cells, one can never compare with certainty test values since they depend on the sensitivity of two or more cells, and these are not uniform. Furthermore, such arrangement is readily adaptable to recording more than one E. M. F. or primary action by intermittent connection with various T. C.'s or other sources of measurable electric response. It can thus be used as a recording photometer or spectrophotometer.

The invention is applicable to innumerable industrial or scientific uses. For example, my control system may be used as a means for operating a recording extensometer or flexometer as well as for the control of operations in accordance with any predetermined requirements, as, for instance, time and temperature controlling instruments. Numerous variations of possible adaptations of the fundamentals of my invention make is applicable to many other purposes and uses. Of course, it is understood that the details of my system as illustrated in the drawings may be varied by the substitution of equivalents without departing from the scope of the invention particularly with respect to the presence of some adequate mechanism, of which the shutter arrangement of this application is but typical, for dividing an area into numerous sections and thereby giving effect to results which depend upon the direction of a beam of light tested by such areas in relation to a light-sensitive element. This obviously applies to the circuits, the cam system, the shutters, the light source, mirror, etc. For example, the shutters may be replaced by rotating perforated discs or the like, or they may be omitted altogether, provided the equivalent effect is obtained by suitable manipulation of the light source or control of the intensity of the light beam, or variations in the sensitivity of various portions of the cell. In fact, almost every part of this system can be substituted by some equivalent. The intent of the following claims is to cover and include all such equivalents.

I claim:

1. In an electrical controlling system, a casing containing a light responsive element and having an opening, means for projecting light towards any one of three sections of said opening, shutter mechanism, means for operating said mechanism to control said sections, a carriage movable in two directions, electrical motor means for said carriage, circuits rendered operative by said element for causing said motor to move said carriage in one direction when light is projected in the direction of one of said sections, circuits rendered operative by said element for causing said motor to move said carriage in the opposite direction when light is projected in the direction of the second section, and circuits rendered operative by said element for stopping said motor when light is directed on the third section.

2. In an electrical controlling system, a source of light, a casing containing a photoelectric cell and having an opening, a mirror for reflecting light from said source towards any one of five sections *a–e* of said opening, shutter mechanism, means for actuating said mechanism periodically and alternately to open sections *a*, *b*, *d*, and *e*, section *c* being permanently blocked, a carriage movable in two directions, electrical motor means for said carriage, circuits controlled by said cell for causing said motor to move said carriage in one direction when light is projected in the direction of sections *a* or *b*, circuits also controlled by said cell for causing said motor to move said carriage in the opposite direction when light is projected in the direction of sections *d* or *e*, and further circuits controlled by said cell for stopping said motor, permanently while light is directed on section *c* and periodically when light is directed on sections *b* or *d*.

3. In an electrical controlling system, a source of light, a casing containing a photoelectric cell and having an opening, a mirror for reflecting light from said source towards any one of five sections *a–e* of said opening, two shutters, one arranged to obstruct and free sections *a*, *b*, and *d* of the opening and the other sections *b*, *d*, and *e*, section *c* being permanently obstructed by said shutters, a first and a second cam for opening and closing each shutter alternately, contacts operated by said cams, a third cam having contacts, a common shaft carrying said cams, a carriage movable in two directions, electrical motor means for said carriage, circuits including the contacts of said first cam for causing said motor to move said carriage in one direction when light is projected in the direction of sections *a* or *b*, circuits including the contacts of said second cam for causing said motor to move said carriage in the opposite direction when light is projected in the direction of sections *d* or *e*, and circuits controlled by the contacts of the third cam for stopping said motor, permanently while light is directed on section *c* and periodically when light is directed on sections *b* or *d*.

4. In combination, a potentiometer, a stylus cooperating with said potentiometer, a motor for moving said stylus with respect to said potentiometer, an element responsive to light, a light source, means for varying the direction of the beam from said source with reference to said element in accordance with variations in the electrical conditions of the potentiometer, means for periodically and alternately exposing one of a plurality of parts of said element and means selectively responsive to the effects of such exposures for controlling the operation of said motor.

5. In the combination defined in claim 4, a mirror galvanometer and lamp constituting said light source.

6. In the combination defined in claim 4 a thermocouple for varying the electrical conditions of the said potentiometer.

7. In the combination defined in claim 4, in which the means responsive to the light source include a photo-electric cell and shutters mechanically controlled for periodically and intermittently exposing a succession of a measured plurality of areas of said cell.

8. A recording instrument comprising in combination an electrical network, a stylus cooperating with said net-work, a motor for moving said stylus with respect to said circuit, a light source, a mirror cooperating with said circuit, means for varying the direction of the beam as projected from said light source by said mirror in accordance with variations in the electrical conditions of said circuit, an element responsive to said light source, means for periodically and alternately exposing one of a plurality of parts of said element to test the direction of light as projected by said mirror and means selectively responsive to the effects of such exposures for controlling the operation of said motor.

9. In the combination defined in claim 8, a potentiometer and thermocouple constituting said electrical circuit.

10. In the combined defined in claim 8, a resistance thermometer and bridge constituting said electrical circuit.

11. In the combination defined in claim 8, a thermocouple and millivoltmeter constituting said circuit.

12. A temperature recording instrument comprising in combination a temperature responsive element, a mirror cooperating with said element, a light source, a stylus, a motor for moving said stylus across a chart, means for synchronizing movement of the mirror with the movement of the stylus, a light responsive element, means for periodically and alternately exposing one of a plurality of parts of said element to test the direction of light as projected by said mirror, means for so limiting the total range of movement of the mirror that light projected therefrom in any of its extreme positions will fall within areas of exposure of the element and means selectively responsive to the effects of each of the successive exposures of the element for controlling the operation of said motor.

13. A temperature-recording instrument as set forth in claim 12, in which the means which effect the periodic exposure of the light-responsive element comprise shutters mechanically controlled for periodically and intermittently exposing a succession of different areas of said element to said source.

14. In an electrical controlling system, a plurality of circuits, a single light-responsive element, means for deflecting bodily one and the same beam of light with reference to said light responsive element in dependence upon fluctuations of a magnitude to be measured, means to test the position of the beam with respect to the element, said means including agencies for successively blocking diverse areas of the element against access by the beam in the field of the blocked areas, and means selectively operative to control said circuits according to the particular position of the beam as established with respect to the element at the testing moments by the then blocked and unblocked areas of the element.

15. In an electrical controlling system, a plurality of circuits, a single light-responsive element, means for deflecting bodily one and the same beam of light with reference to said light responsive element in dependence upon fluctuations of a magnitude to be measured, means to test the direction of the beam with respect to the element, said means including agencies for periodically blocking diverse areas of the element against access by the beam in the field of the blocked areas, and means selectively operative to control said circuits according to the particular direction of the beam as established with respect to the element at the testing moments by the then blocked and unblocked areas of the element.

16. In an electrical controlling system, a plurality of circuits, a single light-responsive element, means for deflecting bodily one and the same beam of light with reference to said light responsive element in dependence upon fluctuations of a magnitude to be measured, means to test the direction of the beam with respect to the element, said means including agencies for successively in regular periodic sequence blocking diverse areas of the element against access by the beam in the field of the blocked areas, and means selectively operative to control said circuits according to the particular direction of the beam as established with respect to the element at the testing moments by the then blocked and unblocked areas of the element.

17. An electrical controlling system such as set forth in claim 14 in which the light-responsive element is normally disassociated from the circuits, and the selectively operative means for controlling the circuits includes means for periodically associating and rendering effective said element and circuits in succession according to the particular locations of the beam as established with respect to the element at the testing moments by the then blocked and unblocked areas of the element.

18. An electrical controlling system such as set forth in claim 14, in which the means selectively operative to control the circuits include means for associating the light-responsive element with the circuits in succession.

19. In an electrical controlling system, movable means for angularly deflecting a beam of light to cause the beam as a whole to change its direction in space, mechanism associated with said means for establishing a measured plurality of light direction testing conditions, an element responsive to all said light direction testing conditions, a plurality of controlling circuits controlled by said element, and means for causing the controlling circuits to be controlled by said element in accordance with the direction of the light.

20. In an electric controlling system a plurality of circuits, a single light-responsive element, an angularly displaceable source of radiant energy in beam form, for changing the direction of the beam as a whole in space, and means for enabling the element to detect left or right deviations of the beam from a normal direction, said means including agencies for successively blocking diverse areas of the element against access by the beam in the field of the blocked areas and means selectively operative for controlling said circuits according to left or right deflection of the beam as established by the succession of blocked and unblocked areas of the element.

21. In an electrical controlling system, a plurality of circuits, a single light-responsive element, an angularly displaceable source of radiant energy in beam form, for changing the direction of the beam as a whole in space, and means for enabling the element to detect left or right deviations of the beam from a normal direction, said means including agencies for successively blocking diverse areas of the element against access by the beam in the field of the blocked areas and means for controlling said circuits selectively operative according to left or right deflection of the beam as established by the succession of blocked and unblocked areas of the element.

22. In an electrical controlling system, a plurality of circuits, a single light-responsive element, a source of light directed as a beam toward said element, agencies for successively blocking at least five diverse areas of said element against access by the beam in the field of the blocked areas, electrically controlled mechanism responsive to said circuits and means for continuously operating said mechanism normally or in reverse when one of the other of two of such blocked areas is unblocked and the beam reaches the element therethrough, for intermittently operating said mechanism normally or in reverse when one or the other of two other such areas is unblocked and the beam reaches the element therethrough, and for stopping said mechanism entirely when a fifth section alone is blocked and the beam is blocked thereby.

23. In an electrical controlling system, a plurality of circuits, a single light-responsive element, a source of light, control mechanism, means for enabling said mechanism to be operated in ways representing departures from the normal condition of said mechanism, and means for operating the control mechanism continuously in at least one of its departures from normal when the light is deflected far from its normal position, for operating the control mechanism intermittently in at least one of its departures from its normal condition when the light is deflected but slightly from its normal position and for returning the mechanism to its normal condition when the light is not materially deflected from its normal position.

24. In an electrical controlling system, a plurality of circuits, a single light-responsive element, a source of light directed as a beam toward said element, means to test the direction of the beam with respect to the element, said means including agencies for successively blocking diverse areas of the element against access by the beam in the field of the blocked areas, stops for so limiting the total range of beam directions with relation to the element that the beam in any of its extreme positions will always fall within either blocked or unblocked areas of the element, and means selectively operative to control said circuits according to the particular direction of the beam as established with respect to the element at the testing moments by the then blocked and unblocked areas of the element.

25. In an electrical controlling system, means for converting variations in a physical magnitude into displacements of a light beam in both directions from a predetermined normal position and thereby establishing a measured plurality of light direction testing conditions, a single light-sensitive element responsive to all said light direction testing conditions, and a plurality of controlling circuits controlled by said element and cooperating with said means to restore said beam to its normal position.

26. In an electrical controlling system, means for converting variations in a physical magnitude into displacements of a light beam in both directions from a predetermined normal position and thereby periodically establishing a measured plurality of light direction testing conditions, a single light-sensitive element responsive to all said light direction testing conditions, and a plurality of circuits, each representing a certain light direction testing condition controlled by said element and cooperating with said means to restore said beam to its normal position.

27. In an electrical controlling system, means for converting variations in a physical magnitude into displacements of a light beam from a predetermined normal position and thereby periodically establishing a measured plurality of light direction testing conditions, a single light sensitive element responsive to all said light direction testing conditions, means for preparing a plurality of circuits, one upon the establishment of each light direction testing condition, for restoring the beam to its normal condition, and means controlled by said element for completing the prepared circuit.

28. In an apparatus of the class described, the combination comprising a net-work including two or more sections which can be brought to equality of electrical condition, beam emitting means responsive to an unbalanced condition in said sections, and mechanism operative to restore electrical equilibrium in said sections, said mechanism including means for periodically blocking the beam and including also photoelectric means cooperating with said beam emitting means in the unblocked condition of the beam to cause re-establishment of the balanced electrical condition in said sections, said mechanism further including connections whereby after the photoelectric means has been effected by the beam in certain of its directions, the mechanism will continue to function in the direction of re-establishment of a balanced electrical condition in the said sections during at least certain of the periods in which the beam is blocked.

29. In apparatus of the class described, the combination comprising a net-work including two or more sections which can be brought to equality of electrical condition, beam emitting means responsive to an unbalanced condition in said sections, and mechanism operative to restore electrical equilibrium in said sections, said mechanism including means for periodically blocking the beam and including also photoelectric means cooperating with said beam emitting means in the unblocked condition of the beam to cause re-establishment of the balanced electrical condition in said sections, said mechanism further including connections whereby after the photoelectric means has been affected by the beam in certain of its directions the mechanism will cease to advance in the direction of re-establishment of the balanced electrical condition in the said sections during at least certain of the periods in which the beam is blocked and until on subsequent unblocking of the beam the latter again impinges the photoelectric means.

30. A recording instrument comprising a net-work including two or more sections which can be brought to equality of electrical condition, beam emitting means responsive to an unbalanced condition in said sections to deflect a beam to one or the other side of a predetermined normal position for said beam, and mechanism operative to restore equality of electrical condition in said sections upon displacement of said beam emitting means and thereby return the beam to its normal position, said mechanism including a single photoelectric cell arranged to be energized by the emitted beam in different directions of the latter.

31. A recording instrument comprises a potentiometer network including a resistance, a contact cooperating with said resistance and movable into position wherein the branches of the potentiometer network are in equilibrium, and a mirror galvanometer having a predetermined normal position when the said branches are in equilibrium and arranged to throw a beam to one or the other side of said normal position when the branches are unbalanced; a source of light for said galvanometer; means for moving said contact; and mechanism including a single photoelectric cell responsive to deflections of said light beam to both sides of the normal position to cause actuation of said contact moving means in a direction to restore a predetermined condition in said network.

32. A recording instrument comprising a potentiometer network including a mirror galvanometer and thermocouple connected with a source of opposing electromotive force across a variable resistance bridge, means arranged to direct a beam of light onto the mirror galvanometer, a single photoelectric cell adapted to be impinged by the reflected beam, a movable contact cooperating with the resistance bridge to regulate the counter-electromotive force acting on the thermocouple, a reversible motor for operating said contact, and means controlled by the photoelectric cell for actuating the motor in one or the other direction according to the position of the beam relatively to said cell to move the contact until equilibrium is established and the mirror galvanometer returned to its original position.

33. In an electrical controlling system, means for converting variations in a physical magnitude into displacements of a beam of light in both directions from a predetermined normal position and thereby establishing a measured plurality of light direction testing conditions, mechanism for determining the direction of said beam including photoelectric means having all of its sensitive area in series with a single pair of external conductors, and a plurality of controlling circuits controlled by said photoelectric means through said conductors and effective upon said first-mentioned means to restore said beam to its normal position.

34. In combination, a light beam sending element and a single light-sensitive cell displaceable relatively to each other and adapted to occupy a predetermined normal position with respect to each other, means for locating the position of a beam of light from said element with reference to said cell, a plurality of circuits operative in the different detected positions of the beam so to adjust the light sending element and light-sensitive cell relatively to each other that they are restored to their normal relative position, and means cooperating with the cell for automatically making that circuit effective to cause relative movement between said element and cell in a direction toward their normal relative position which corresponds to the position in which the light beam is detected.

35. In an apparatus of the class described, the combination of an electrical net-work including two or more sections which can be brought to equality of electrical condition, a movable beam throwing device associated with said net-work and adapted to be deflected from a normal position when said net-work becomes unbalanced, means responsive to radiant energy and arranged to be impinged by said beam, shutter mechanism and means for operating the same to expose different portions of said responsive means in rotation, means operable to restore equality of electrical condition in said sections, a pointer associated with said last-mentioned means, and a plurality of circuits cooperating with said responsive means and said shutter mechanism to actuate said restoring means according as the beam is deflected to one or the other side of its normal position to cause re-establishment of equality of electrical condition in said net-work.

36. In combination, a selectively operable mechanism movable in one or the other direction in dependence upon the fluctuations of a magnitude to be measured which are convertible into deflections of a beam of light, electrical circuits for variably moving said mechanism, a light responsive element, means for periodically and sequentially exposing one of a plurality of parts of said element, means for synchronizing the exposing means and electrical circuits with the parts exposed, and means controlled by said element for periodically and sequentially affecting said circuits.

37. In combination, a selectively operable mechanism movable in one or the other direction in dependence upon the fluctuations of a magnitude to be measured which are convertible into deflections of a beam of light, electrical circuits for variably moving said mechanism, a light responsive element, means for preparing said circuits in succession, means for periodically and sequentially exposing one of a plurality of parts of said element, means for synchronizing the mechanism and electrical circuits with the parts exposed, and means controlled by said element for periodically completing prepared circuits.

38. In combination a selectively operable mechanism movable in one or the other direction in dependence upon the fluctuations of a magnitude to be measured which are convertible into deflections of a beam of light, electrical circuits for variably moving said mechanism, a light responsive element, a source of light, means for projecting light on said element at one at a time of a measured plurality of areas, means for preparing said circuits in a succession corresponding to said areas, and means controlled by said element for periodically completing any prepared circuit in accordance with the conditions created as the result of the light reaching or failing to reach any particular area.

39. In combination, a source of light, a light responsive element, movable means for sweeping a beam of light from said source over said element so as to strike one of a plurality of areas of such element in succession while the other areas remain unilluminated, a variably operable mechanism movable in one or the other direction in dependence upon the deflections of the beam of light from a normal position, and means for controlling said mechanism in accordance with the response of said element to light projected thereon at one or another of said plurality of areas.

40. In combination, means for projecting a travelling beam of light so that the same bundle of rays is caused to sweep over different areas of an impinged object, mechanism for translating the travel of said beam, a single light responsive element, means for periodically and sequentially exposing one of a plurality of parts of said element, and means governed by the effects of such successive exposures for controlling all operations of said mechanism.

41. In combination, means for projecting a beam of light travelling in two directions so that the same bundle of rays is caused to sweep over different areas of an impinged object, mechanism for translating the direction of travel of said beam in both directions, a single light responsive element, means for periodically and sequentially exposing one of a plurality of parts of said element, and means governed by the effects of such successive exposures for controlling all operations of said mechanism.

42. In combination, means for projecting a travelling beam of light towards any part of a limited space at a time so that the same bundle of rays is caused to sweep through different parts of said space and to illumine different areas of an impinged object as the deflection of the beam varies, means for periodically and sequentially testing for the presence of the light in various subdivisions of said space, a controlling circuit corresponding to each periodic test, and means for affecting the corresponding controlling circuit according as the subdivision tested is illuminated.

43. In combination, means for projecting a travelling beam of light towards any part of a limited space at a time so that the same bundle of rays is caused to sweep through different parts of said space and to illumine different areas of an impinged object as the deflection of the beam varies, means for periodically and sequentially testing for the presence of the light in various subdivisions of said space, a controlling circuit corresponding to each periodic test, and means for closing the corresponding controlling circuit whenever light is projected towards the subdivision tested.

44. In combination, a selectively operable mechanism movable in opposite directions in dependence upon the fluctuations of a magnitude to be measured, means for converting the fluctuations of said magnitude to be measured into bodily deflections of a beam of radiant energy, a responsive device presenting a surface sensitive to said beam, means for testing for the presence of the beam over a plurality of delimited areas within the confines of said sensitive surface and at both sides of a normal position of the beam in predetermined sequence, a plurality of electrical circuits associated with said responsive device and with said selectively operable mechanism for operating the latter selectively in one or the other direction, means for continuously preparing the said circuits in predetermined sequence in synchronism with the sequence of the testing means, and means actuated by the responsive device upon concurrence of the detection of the beam in one of said areas with the preparation of the associated circuit to complete said circuit and thereby effect movement of said mechanism in the direction corresponding to such circuit, and means operating concurrently with the movement of said mechanism for effecting return of the beam toward its normal position.

CHARLES O. FAIRCHILD.